(12) United States Patent
Shimizu et al.

(10) Patent No.: US 7,387,834 B2
(45) Date of Patent: Jun. 17, 2008

(54) POLYTETRAFLUOROETHYLENE FINE POWDER OF PARTICULAR SPECIFIC STANDARD GRAVITY, POLYTETRAFLUOROETHYLENE FORMED ARTICLE PREPARED FROM THE SAME AND METHOD FOR PREPARATION OF THE SAME

(75) Inventors: Tetsuo Shimizu, Settsu (JP); Michio Asano, Settsu (JP); Makoto Ono, Settsu (JP); Yoshinori Nanba, Settsu (JP); Shunji Kasai, Settsu (JP); Shinichi Yano, Settsu (JP); Hiroyuki Yoshimoto, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 26 days.

(21) Appl. No.: 10/485,352

(22) PCT Filed: Aug. 1, 2002

(86) PCT No.: PCT/JP02/07845

§ 371 (c)(1),
(2), (4) Date: Jan. 30, 2004

(87) PCT Pub. No.: WO03/014197

PCT Pub. Date: Feb. 20, 2003

(65) Prior Publication Data

US 2004/0197566 A1    Oct. 7, 2004

(30) Foreign Application Priority Data

Aug. 2, 2001 (JP) ............................. 2001/234947

(51) Int. Cl.
B32B 5/16 (2006.01)
B05D 7/00 (2006.01)
(52) U.S. Cl. ........................................ 428/403; 427/212
(58) Field of Classification Search ................ 428/403; 427/212
See application file for complete search history.

(56) References Cited

U.S. PATENT DOCUMENTS

| 3,142,665 | A |   | 7/1964  | Cardinal et al. |
|-----------|---|---|---------|-----------------|
| 3,981,853 | A | * | 9/1976  | Manwiller ................. 526/255 |
| 4,640,955 | A | * | 2/1987  | Malhotra ................... 524/546 |
| 4,650,833 | A | * | 3/1987  | Sakagami et al. .......... 525/356 |
| 4,711,949 | A | * | 12/1987 | Aramaki et al. ............ 525/356 |
| 4,837,267 | A |   | 6/1989  | Malhotra |
| 4,840,998 | A | * | 6/1989  | Shimizu et al. ............ 525/276 |
| 4,908,415 | A | * | 3/1990  | Aramaki et al. ............ 525/356 |
| 5,118,788 | A | * | 6/1992  | Hosokawa et al. ......... 528/503 |
| 5,194,459 | A | * | 3/1993  | Sato et al. .................. 523/219 |
| 5,284,708 | A | * | 2/1994  | Shimizu et al. ............ 428/402 |
| 5,324,785 | A | * | 6/1994  | Noda et al. ................. 525/276 |
| 5,589,271 | A | * | 12/1996 | Watanabe et al. .......... 428/421 |
| 5,677,515 | A | * | 10/1997 | Selk et al. .................. 174/255 |
| 5,700,889 | A | * | 12/1997 | Blair .......................... 526/247 |
| 5,900,502 | A | * | 5/1999  | Skinner et al. ............. 558/303 |
| 6,203,733 | B1 | * | 3/2001 | Funaki et al. .............. 264/117 |
| 6,503,988 | B1 | * | 1/2003 | Kitahara et al. .......... 525/326.2 |
| 6,523,252 | B1 | * | 2/2003 | Lipponen .................... 29/828 |
| 6,531,557 | B1 | * | 3/2003 | Hosokawa et al. ......... 526/247 |
| 6,841,594 | B2 | * | 1/2005 | Jones et al. ................. 523/201 |
| 6,911,489 | B2 | * | 6/2005 | Baron et al. ................ 523/330 |

FOREIGN PATENT DOCUMENTS

| EP | 0 457 255 A2 | 11/1991 |
| JP | 62-104822 A | 5/1987 |
| JP | 63-56532 A | 3/1988 |
| JP | 3-184209 A | 8/1991 |
| JP | 7-5743 B | 1/1995 |
| JP | 7-30134 B | 4/1995 |
| JP | 9-87334 A | 3/1997 |
| JP | 10-87746 A | 4/1998 |
| JP | 10-147617 A | * 6/1998 |
| JP | 2003-048992 A | * 2/2003 |
| WO | WO00/02935 A1 | 1/2000 |

OTHER PUBLICATIONS

English translation of International Preliminary Examination Report for PCT/JP02/07845 dated Aug. 28, 2003.

* cited by examiner

*Primary Examiner*—H. T Le
(74) *Attorney, Agent, or Firm*—Sughrue Mion, PLLC

(57) ABSTRACT

The present invention provides a polytetrafluoroethylene molded article, particularly a PTFE molded article for high-frequency insulation, which is excellent in various electric properties and mechanical properties in a high frequency range of 3 to 30 GHz. The present invention also provides PTFE fine powder, which is excellent in extrusion moldability and capable of providing the molded article, and a process for preparing the same. More specifically, the present invention relates to a polytetrafluoroethylene fine powder having a standard specific gravity of 2.180 to 2.225, which is obtained by contacting polytetrafluoroethylene fine powder having a standard specific gravity of 2.180 to 2.225 with a fluorine radical source, wherein $\tan\delta$ at 12 GHz of a film comprising the powder, which is obtained by cooling at 5 to 50° C./second after baking, is at most $2.0 \times 10^{-4}$.

15 Claims, No Drawings

POLYTETRAFLUOROETHYLENE FINE POWDER OF PARTICULAR SPECIFIC STANDARD GRAVITY, POLYTETRAFLUOROETHYLENE FORMED ARTICLE PREPARED FROM THE SAME AND METHOD FOR PREPARATION OF THE SAME

TECHNICAL FIELD

The present invention relates to a polytetrafluoroethylene molded article, particularly a PTFE molded article for high-frequency insulation, which is excellent in various electric properties and mechanical properties in a high frequency range of 3 to 30 GHz. The present invention also relates to PTFE fine powder, which is excellent in extrusion moldability and capable of providing the molded article, and a process for preparing the same.

BACKGROUND ART

Development in communication means using electromagnetic waves is remarkable. Along with the increase in the amount of transmitted information, the electromagnetic waves tend to increasingly be used in a high frequency range. For example, for wireless LAN and cellular phones, UHF up to a frequency of 300 MHz is used. However, for high frequency wireless LAN, satellite communication and cellular phone base stations which are central to future development, microwaves of 3 to 30 GHz are used.

When using such high frequency, electric properties such as stable and low dielectric constant ($\epsilon r$) and low dielectric loss tangent ($\tan\delta$), ease in mold processing and heat resistance to plating and soldering are required in material used for electric parts such as a connector and communication equipment such as casing and a coaxial cable. Therefore, fluororesin, which is excellent in electric properties, is conventionally used.

Examples of fluororesin used in communication equipment are polytetrafluoroethylene (homopolymer of tetrafluoroethylene (hereinafter referred to as TFE)) and a copolymer obtained by copolymerizing TFE and a small amount of a fluoromonomer (so-called modified PTFE, hereinafter also referred to as PTFE), which cannot be melt processed, and a copolymer of tetrafluoroethylene (TFE) and hexafluoropropylene (hereinafter referred to as HFP) (content of FEP and HFP at least 6.9% by mole) and a copolymer of TFE and perfluoro(alkylvinylether) (hereinafter referred to as PAVE) (content of PFA and PAVE at least 1.5% by mole), which can be melt processed.

Although depending on the type of initiator, the fluororesin mentioned above have a group such as —$CF_2H$, —$CH_2OH$, —$CH_3$, —COF and —COOH in the terminal. These terminal groups are thermally unstable and may impair water repellency. The method of fluorinating in order to stabilize the unstable terminal groups is already known (JP-B-46-23245, JP-A-10-147617, JP-B-2921026).

However, it is not known that electric properties such as high frequency properties are improved by fluorinating the unstable terminal groups.

The present invention solves the above problems. The unstable terminal groups were found to influence electric properties, particularly high frequency properties such as $\tan\delta$ in a high frequency range. As a result of intensive studies, not only thermal stability but also processability and high frequency properties such as $\tan\delta$ were found to improve, by fluorinating the unstable terminal groups of PTFE fine powder, which has a particular standard specific gravity and cannot be melt processed, among fluororesin. Furthermore, the high frequency properties and mechanical properties of the molded article obtained therefrom were also found to improve and the present invention was achieved.

DISCLOSURE OF INVENTION

That is, the present invention relates to a polytetrafluoroethylene fine powder having a standard specific gravity of 2.180 to 2.225, which is obtained by contacting polytetrafluoroethylene fine powder having a standard specific gravity of 2.180 to 2.225 with a fluorine radical source; wherein $\tan\delta$ of the polytetrafluoroethylene fine powder at 12 GHz, which is measured by the following method using a sample film prepared under the following conditions, is at most $2.0\times10^{-4}$.

(Conditions for Preparing Sample Film)

The PTFE fine powder is compression molded into a cylinder. A film having a thickness of 0.5 mm which is cut out from the cylinder is baked by heating at 380° C. for 5 minutes in a convection electric furnace. Immediately thereafter, the film is taken out into air of room temperature (25° C.) and stood to cool to room temperature at 5 to 50° C./second, to prepare a sample film.

(Measurement Method of $\tan\delta$)

Changes in resonance frequency and Q value of the prepared film are measured by a cavity resonator using a network analyzer and $\tan\delta$ at 12 GHz is calculated from the following equation.

$$\tan\delta = (1/Qu) \times \{1 + (W_2/W_1)\} - (Pc/\omega W_1)$$

$$\varepsilon_r = \left(\frac{c}{\pi \times L \times F_0}\right)^2 \times \left\{X^2 - Y^2\left(\frac{L}{2M}\right)^2\right\} + 1$$

$$X\tan X = (L/2M)Y\cos Y$$

$$X = \frac{L}{2}\sqrt{\varepsilon_r \times k_0^2 - k_r^2}$$

$$Y = M\sqrt{k_0^2 - k_r^2}$$

$$k_0 = \frac{\varpi}{c}$$

$$\varpi = 2\pi F_0$$

$$k_r = \frac{3.8317}{D/2}$$

$$Q_u = \frac{Q_L}{1 - 10^{(-ld/20)}}$$

$$Q_L = \frac{F_0}{F_1 - F_2}$$

$$W_1 = \frac{1}{8} \times \varepsilon_r \times \varepsilon_0 \times L \times \pi \times \varpi^2 \times \mu_0^2 \times J_1^2 \times J_0^2 \times \left(1 + \frac{\sin X}{2X}\right)$$

$$W_2 = \frac{1}{4} \times \varepsilon_0 \times M \times \pi \times \left(1 - \frac{\sin 2Y}{2Y}\right) \times \varpi^2 \times \mu_0^2 \times J_1^2 \times J_0^2$$

$$P_C = P_1 + P_2 + P_3$$

$$P_1 = \frac{1}{2} \times Rs \times \frac{D}{2} \times L \times \pi \times \left(1 - \frac{\sin X}{2X}\right) \times \left(\frac{J_1 \times 2}{D}\right)^4 \times J_0^2$$

$$P_2 = \frac{1}{2} \times \left(\frac{-\cos X}{\sin Y}\right)^2 \times Rs \times \frac{D}{2} \times M \times \pi \times \left(1 - \frac{\sin 2Y}{2Y}\right) \times \left(\frac{J_1 \times 2}{D}\right)^4 \times J_0^2$$

$$P_3 = \frac{1}{2} \times \left(\frac{-\cos X}{\sin Y}\right)^2 \times Rs \times \pi \times \left(J_1 \times J_0 \times \frac{Y}{M}\right)^2$$

Symbols in the equations represent the following.
D: diameter of cavity resonator (mm)
M: length of cavity resonator (mm)
L: length of sample (mm)
c: light velocity (m/s)
Id: amount of decay (dB)
$F_0$: resonance frequency (Hz)
$F_1$: upper frequency when the amount of decay from the resonance point is 3 dB (Hz)
$F_2$: lower frequency when the amount of decay from the resonance point is 3 dB (Hz)
$\epsilon_0$: dielectric constant of vacuum (H/m)
$\epsilon_r$: specific dielectric constant of sample
$\mu_0$: magnetic permeability of vacuum (H/m)
RS: effective surface resistance considering surface roughness of conductor cavity (Ω)
$J_0$: −0.402759
$J_1$: 3.83171

The tanδ is preferably at most $1.8 \times 10^{-4}$.

The average particle size of the polytetrafluoroethylene fine powder is preferably 200 to 800 μm.

The present invention also relates to a polytetrafluoroethylene molded article comprising the polytetrafluoroethylene fine powder.

The present invention also relates to a coaxial cable for high frequency communication, which is coated with the polytetrafluoroethylene molded article.

The present invention also relates to a LAN cable for high frequency communication, which is coated with the polytetrafluoroethylene molded article.

The present invention also relates to a printed wiring board having an insulator comprising the polytetrafluoroethylene molded article.

The present invention also relates to a process for preparing a polytetrafluoroethylene fine powder which comprises contacting polytetrafluoroethylene fine powder, which has a standard specific gravity of 2.180 to 2.225 and unstable groups in the molecule terminal, with a fluorine radical source.

BEST MODE FOR CARRYING OUT THE INVENTION

The PTFE as a raw material used in the present invention can be the homopolymer of TFE mentioned above or can be a copolymer (modified PTFE) of 99.9 to 99.9999% by mole of TFE and 0.0001 to 0.1 mole % of at least one monomer selected from the group consisting of fluoroolefin represented by formula (I):

  (I)

(wherein X, Y and Z are the same or different and are all a hydrogen atom or a fluorine atom and n is an integer of 1 to 5) and perfluoro(alkylvinylether) (hereinafter referred to as PAVE) represented by formula (II):

  (II)

(wherein $R^f$ is a perfluoroalkyl group having 1 to 3 carbon atoms). As mentioned above, the homopolymer and modified PTFE are both referred to as PTFE in the present specification unless mentioned otherwise. Also, when the two must be differentiated, PTFE before fluorination is referred to as PTFE as a raw material and PTFE after fluorination is referred to as fluorinated PTFE.

Examples of the fluoroolefin represented by the above formula (I) are perfluoroolefin such as hexafluoropropylene (hereinafter referred to as HFP) and fluoroolefin such as perfluorobutylethylene. Of these, HFP is preferable from the viewpoint of electric properties.

Examples of the perfluoro(alkylvinylether) represented by the above formula (II) are perfluoro(methylvinylether) (hereinafter referred to as PMVE), perfluoro(ethylvinylether) (hereinafter referred to as PEVE) and perfluoro(propylvinylether) (hereinafter referred to as PPVE). Of these, PMVE is preferable from the viewpoint that electric properties are excellent.

The fine powder of PTFE as raw material used in the present invention is obtained by emulsion polymerization using a polymerization initiator in the presence of an emulsifier, particularly a fluorine-containing emulsifier. In order to lower the molecular weight of the obtained polymer, the methods of increasing the amount of the polymerization initiator, adding a chain transfer agent and adding a modified monomer can be employed. Examples of the polymerization initiator are ammonium persulfate (APS) and disuccinate peroxide (DPS). Examples of the chain transfer agent are hydrocarbon such as hydrogen, methane, ethane, propane and butane and water-soluble compounds such as methanol and ethanol.

Furthermore, by giving a core-shell structure to the colloid primary particles obtained by emulsion polymerization, moldability, particularly paste extrusion moldability, can be improved. As the core-shell structure, a particle in which the core is formed by a homopolymer of TFE and the shell is formed by modified PTFE is preferable from the viewpoint that paste extrusion moldability is favorable.

The standard specific gravity of the PTFE as a raw material used in the present invention is 2.180 to 2.225. Preferably, the lower limit is 2.190 and the upper limit is 2.220. When the standard specific gravity of the PTFE as a raw material is less than 2.180, the effect of stabilizing unstable terminal groups when fluorinating by contacting with a fluorine radical source is small and improvement in electric properties is small. When the standard specific gravity of the PTFE as a raw material is more than 2.225, strength and moldability decrease and cracks increase.

In the present invention, the unstable terminal groups are stabilized by subjecting the fine powder of raw material PTFE having the above standard specific gravity to fluorination treatment by contacting with a fluorine radical source.

The reaction temperature of the fluorination treatment is preferably 100° to 250° C., more preferably 110° to 200° C. When the reaction temperature is less than 100° C., the reaction speed tends to become slow. When the reaction temperature is higher than 250° C., the fine powder of raw material PTFE tends to fuse together and decompose and evaporate.

In addition to fluorine gas, examples of the fluorine radical source are compounds which are gas at the reaction temperature such as halognated fluoride including ClF, ClF$_3$, BrF$_3$ and IF$_3$, fluoride of rare gas including XeF$_2$, XeF$_4$ and KrF$_2$ and nitrogen-containing fluorine compound including NF$_3$ and NF$_2$. Of these, in view of handling properties and cost, fluorine gas is most preferable. In the case of conducting fluorination treatment using fluorine gas, the fine powder of raw material PTFE is contacted with fluorine gas at 110° to 250° C. for 1 to 10 hours. Preferably, the reaction temperature is 180° to 230° C. and the reaction time is 2 to 5 hours. As the reaction pressure, 0.1 to 1 MPa is sufficient and atmospheric pressure is preferable. The fluorine gas can be pure fluorine gas or can be diluted to 5 to 25% by volume, preferably 7 to 20% by volume, by inert gas such as nitrogen gas, argon gas and helium gas.

The amount of the fluorine radical source differs depending on the reaction temperature, reaction time and type of fluorine radical source, but is preferably 0.01 to 1 part by weight, more preferably 0.1 to 0.5 part by weight, converted to fluorine atoms based on 100 parts by weight (hereinafter referred to as "parts") of the fine powder of raw material PTFE. When the amount of the fluorine radical source is less than 0.01 part, fluorination of the PTFE as a raw material tends to be insufficient. Also, even when the amount of the fluorine radical source added is more than 1 part, the effect of fluorination does not improve, thus becoming uneconomical.

The reaction device used in fluorination treatment can be used without difficulty as long as the device can sufficiently conduct solid-gas contact. Specifically, examples are a fluidized bed-type or shelf-type solid-gas contacting reaction device.

In the fluorinated PTFE fine powder obtained in this way, the —COOH terminal group is fluorinated and replaced with a —$CF_3$ or a —COF group. Furthermore, when fluorination treatment is conducted at a reaction temperature of at least 180° C., the —COF group is also replaced with —$CF_3$.

The standard specific gravity of the fluorinated PTFE is 2.180 to 2.225. Preferably the lower limit is 2.190 and the upper limit is 2.220. When the standard specific gravity of fluorinated PTFE is smaller than 2.180, the effect of stabilizing the terminal groups when fluorinating is small and improvement in electric properties is small. When the standard specific gravity of fluorinated PTFE is larger than 2.225, strength and moldability decrease and cracks increase. The difference in the PTFE standard specific gravity before and after fluorination is within the range of error.

The fluorinated PTFE fine powder preferably has an average particle size of 200 to 800 μm, more preferably 250 to 600 μm. When the average particle size is less than 200 μm, fine powder increases and the extrusion pressure when extrusion molding tends to become unstable as the pressure is high. When the average particle size is more than 800 μm, unevenness increases as the auxiliary for extrusion has difficulty permeating and extrusion pressure tends to become unstable.

The fluorinated PTFE fine powder of the present invention has a dielectric loss tangent (tanδ) at 12 GHz of at most $2.0 \times 10^{-4}$, when a sample film is prepared under the following conditions and tanδ is measured by the following method. The tanδ is preferably at most $1.8 \times 10^{-4}$, more preferably at most $1.4 \times 10^{-4}$. When tanδ is more than $2.0 \times 10^{-4}$, dielectric loss when formed into a coaxial cable is large. However, tanδ of the PTFE as a raw material under the same conditions is usually more than $2.0 \times 10^{-4}$.

(Conditions for Preparing Sample Film)

The fluorinated PTFE fine powder is compression molded into a cylinder. A film having a thickness of 0.5 mm which is cut out from the cylinder is baked by heating at 380° C. for 5 minutes in a convection electric furnace. Immediately thereafter, the film is taken out into air of room temperature (25° C.) and stood to cool to room temperature, to prepare the sample film. Hereat, the cooling speed is important. Particularly, the speed for cooling to approximately 290° C., which is the lower limit temperature for crystallization of PTFE, is a factor which influences electric properties. That is, the film is cooled at a speed of 5 to 50° C./second. Preferably, the cooling speed is 18 to 30° C./second. The time required for cooling to the lower limit temperature for crystallization of PTFE (approximately 290° C.) by standing to cool is approximately 2 to 15 seconds (cooling speed approximately 5 to 50° C./second). Conventionally, when measuring tanδ, cooling was conducted gradually (60° C./hour) and so the measurement method of the present invention is conducted under rapid cooling conditions. The tanδ value of the sample obtained under the rapid cooling conditions becomes high. Therefore, even in the case that the tanδ value of the sample obtained under gradual cooling conditions is low, when measured under the rapid cooling conditions, the tanδ value is higher than $2.0 \times 10^{-4}$ of the present invention.

(Measurement Method of tanδ)

Changes in resonance frequency and Q value of the prepared film are measured by a cavity resonator using a network analyzer and tanδ at 12 GHz is calculated from the following equation. The following equation is an equation developed by Yoshio Kobayashi and Junya Sato of the Engineering Department of Saitama University (Yoshio Kobayashi, Junya Sato, "Nondestructive Measurement of Complex Permittivity of Dielectric Plate Materials by a Cavity Resonance Method", Shingaku Gihou, MW 87-53, 1987).

$$\tan\delta = (1/Qu) \times \{1 + (W_2/W_1)\} - (Pc/\omega W_1)$$

$$\varepsilon_r = \left(\frac{c}{\pi \times L \times F_0}\right)^2 \times \left\{X^2 - Y^2\left(\frac{L}{2M}\right)^2\right\} + 1$$

$$X\tan X = (L/2M)Y\cos Y$$

$$X = \frac{L}{2}\sqrt{\varepsilon_r \times k_0^2 - k_r^2}$$

$$Y = M\sqrt{k_0^2 - k_r^2}$$

$$k_0 = \frac{\varpi}{c}$$

$$\varpi = 2\pi F_0$$

$$k_r = \frac{3.8317}{D/2}$$

$$Q_u = \frac{Q_L}{1 - 10^{(-Id/20)}}$$

$$Q_L = \frac{F_0}{F_1 - F_2}$$

$$W_1 = \frac{1}{8} \times \varepsilon_r \times \varepsilon_0 \times L \times \pi \times \varpi^2 \times \mu_0^2 \times J_1^2 \times J_0^2 \times \left(1 + \frac{\sin X}{2X}\right)$$

$$W_2 = \frac{1}{4} \times \varepsilon_0 \times M \times \pi \times \left(1 - \frac{\sin 2Y}{2Y}\right) \times \varpi^2 \times \mu_0^2 \times J_1^2 \times J_0^2$$

$$P_C = P_1 + P_2 + P_3$$

$$P_1 = \frac{1}{2} \times Rs \times \frac{D}{2} \times L \times \pi \times \left(1 - \frac{\sin X}{2X}\right) \times \left(\frac{J_1 \times 2}{D}\right)^4 \times J_0^2$$

$$P_2 = \frac{1}{2} \times \left(\frac{-\cos X}{\sin Y}\right)^2 \times Rs \times \frac{D}{2} \times M \times \pi \times \left(1 - \frac{\sin 2Y}{2Y}\right) \times \left(\frac{J_1 \times 2}{D}\right)^4 \times J_0^2$$

$$P_3 = \frac{1}{2} \times \left(\frac{-\cos X}{\sin Y}\right)^2 \times Rs \times \pi \times \left(J_1 \times J_0 \times \frac{Y}{M}\right)^2$$

Symbols in the equations represent the following.

D: diameter of cavity resonator (mm)
M: length of cavity resonator (mm)
L: length of sample (mm)
c: light velocity (m/s)
Id: amount of decay (dB)
$F_0$: resonance frequency (Hz)
$F_1$: upper frequency when the amount of decay from the resonance point is 3 dB (Hz)
$F_2$: lower frequency when the amount of decay from the resonance point is 3 dB (Hz)
$\varepsilon_0$: dielectric constant of vacuum (H/m)
$\varepsilon_r$: specific dielectric constant of sample
$\mu_0$: magnetic permeability of vacuum (H/m)
Rs: effective surface resistance considering surface roughness of conductor cavity (Ω)
$J_0$: −0.402759
$J_1$: 3.83171

The fluorinated PTFE fine powder is particularly excellent in high frequency properties and is suitable as material for preparing a high frequency insulating molded article. The molded article can be molded from fluorinated PTFE fine powder having a standard specific gravity larger than 2.225, which is mixed with the fluorinated PTFE fine powder of the present invention.

The fluorinated PTFE fine powder of the present invention cannot be melt processed and therefore is mold processed by molding methods such as paste extrusion molding, ram extrusion molding and compression molding. The form of the fluorinated PTFE used for molding can be fine powder or can be further processed into the form of pellets or flakes. Also, in the case of preparing a tube-shaped molded article or a coating layer for an electric wire or cable, paste extrusion molding is preferable and in the case of preparing a molded article in the form of a film, sheet or board, compression molding, paste extrusion molding and immersing are preferably employed.

Usually, the obtained molded article is subsequently baked. The suitable baking temperature is 360° to 400° C. In the present invention, the tanδ value is small even when the molded article is stood to cool (rapid cooling) in air after baking and so strict temperature control is not particularly required. From the viewpoint of specific gravity, gradually cooling at a cooling speed of at most 20° C./minute until at least 250° C. is preferable, as a molded article can be obtained in which specific gravity is raised to a standard specific gravity of at least 2.18, particularly 2.180 to 2.225

The molded article of the present invention obtained in this way is excellent in mechanical properties, as the tensile strength measured according to ASTM D4895 is 25 to 60 MPa, preferably 30 to 40 MPa, and the tensile elongation measured according to JIS K7137-2 is 400 to 900%, preferably 500 to 700%.

The molded article of the present invention is excellent in electric properties in a microwave range (3 to 30 GHz). Also, tanδ (12 GHz) is a low value of $2.0 \times 10^{-4}$ and high frequency properties are excellent.

The molded article of the present invention can be used not only in a microwave range but also in a millimetric wave range, which exceeds 30 GHz, and an UHF (ultra high frequency) range, which is lower than 3 GHz.

Embodiments of the molded article are not particularly limited but dielectric loss is most important and the molded article is particularly useful as a coaxial cable, a LAN cable and an insulating coating or insulating tube of an electric wire for high frequency communication, which require excellent paste extrusion moldability. Also, the molded article is suitable as a connector or printed wiring board, which require soldering. The molded article of the present invention has excellent heat resistance and so heat resistance when soldering is not a problem.

Hereinafter, the present invention is described in detail based on Examples, but not limited thereto.

Each of the property values measured in Examples of the present invention was measured by the following methods.

(Number Average Primary Particle Size of Colloid Particles)

A latex of PTFE particles was diluted with water to 0.15% by weight of solid content and the permeability of projected light of 550 nm to unit length of the diluted latex and the number average particle size determined by measuring the diameter in a specific direction using a transmission electron microscope photograph were measured. An analytical curve was prepared therefrom and used to determine the number average primary particle size of colloid particles from the permeability measured for each sample.

(Standard Specific Gravity)

The standard specific gravity was measured by the water displacement method using a sample prepared according to ASTM D4895-89.

(Dielectric Loss Tangent (tanδ))

The changes in resonance frequency and Q value of the prepared film were measured by a cavity resonator using HP8510C made by Hewlett-Packard Co. as a network analyzer and tanδ at 12 GHz was calculated from the following equation.

$$\tan\delta = (1/Qu) \times \{1 + (W_2/W_1)\} - (Pc/\omega W_1)$$

$$\varepsilon_r = \left(\frac{c}{\pi \times L \times F_0}\right)^2 \times \left\{X^2 - Y^2\left(\frac{L}{2M}\right)^2\right\} + 1$$

$$X \tan X = (L/2M) Y \cos Y$$

$$X = \frac{L}{2}\sqrt{\varepsilon_r \times k_0^2 - k_r^2}$$

$$Y = M\sqrt{k_0^2 - k_r^2}$$

$$k_0 = \frac{\varpi}{c}$$

$$\varpi = 2\pi F_0$$

$$k_r = \frac{3.8317}{D/2}$$

$$Q_u = \frac{Q_L}{1 - 10^{(-Id/20)}}$$

$$Q_L = \frac{F_0}{F_1 - F_2}$$

$$W_1 = \frac{1}{8} \times \varepsilon_r \times \varepsilon_0 \times L \times \pi \times \varpi^2 \times \mu_0^2 \times J_1^2 \times J_0^2 \times \left(1 + \frac{\sin X}{2X}\right)$$

$$W_2 = \frac{1}{4} \times \varepsilon_0 \times M \times \pi \times \left(1 - \frac{\sin 2Y}{2Y}\right) \times \varpi^2 \times \mu_0^2 \times J_1^2 \times J_0^2$$

$$P_C = P_1 + P_2 + P_3$$

$$P_1 = \frac{1}{2} \times Rs \times \frac{D}{2} \times L \times \pi \times \left(1 - \frac{\sin X}{2X}\right) \times \left(\frac{J_1 \times 2}{D}\right)^4 \times J_0^2$$

$$P_2 = \frac{1}{2} \times \left(\frac{-\cos X}{\sin Y}\right)^2 \times Rs \times \frac{D}{2} \times M \times \pi \times \left(1 - \frac{\sin 2Y}{2Y}\right) \times \left(\frac{J_1 \times 2}{D}\right)^4 \times J_0^2$$

$$P_3 = \frac{1}{2} \times \left(\frac{-\cos X}{\sin Y}\right)^2 \times Rs \times \pi \times \left(J_1 \times J_0 \times \frac{Y}{M}\right)^2$$

Symbols in the equations represent the following.
D: diameter of cavity resonator (mm)
M: length of cavity resonator (mm)
L: length of sample (mm)
c: light velocity (m/s)
Id: amount of decay (dB)
$F_0$: resonance frequency (Hz)
$F_1$: upper frequency when the amount of decay from the resonance point is 3 dB (Hz)
$F_2$: lower frequency when the amount of decay from the resonance point is 3 dB (Hz)
$\epsilon_0$: dielectric constant of vacuum (H/m)
$\epsilon_r$: specific dielectric constant of sample
$\mu_0$: magnetic permeability of vacuum (H/m)
Rs: effective surface resistance considering surface roughness of conductor cavity (Ω)
$J_0$: −0.402759
$J_1$: 3.83171

EXAMPLE 1

A tray lined with a TFE-perfluoro(methylvinylether) copolymer sheet was filled with 200 g of PTFE fine powder having a standard specific gravity of 2.224 and a core-shell structure (core: HFP modified PTFE, shell: HFP modified PTFE (chain transfer agent: ethane), total HFP modified amount of core and shell: 0.0013% by mole) in a height of approximately 20 mm. Then, the tray was placed in an electric furnace and mixed gas of fluorine gas/nitrogen gas (20/80 volume ratio) was introduced at a flow rate of 1 liter/minute at 120° C. for 5 hours to obtain fluorinated PTFE fine powder. The number average primary particle size was measured according to the above measurement method.

The obtained fluorinated PTFE fine powder was compression molded into a cylinder using a compression molder. A film having a thickness of 0.5 mm was cut out from the cylinder and baked by heating at 380° C. for 5 minutes in a convection electric furnace. Immediately thereafter, the film was taken out into air of room temperature (25° C.) and stood to cool to room temperature at a cooling speed of 30° C./second, to prepare a film molded article. tanδ was measured according to the above measurement method. The results are shown in Table 1.

COMPARATIVE EXAMPLE 1

The number average primary particle size of the fine powder of raw material PTFE before fluorination used in Example 1 was measured according to the above measurement method. Also, tanδ was measured in the same manner as in Example 1. The results are shown in Table 1.

EXAMPLE 2

Fluorination treatment was conducted and fluorinated PTFE fine powder of the present invention was obtained in the same manner as in Example 1, except that 200 g of PTFE fine powder having a standard specific gravity of 2.199 and a core-shell structure (core: HFP modified PTFE, shell: HFP modified PTFE (chain transfer agent: isobutane), total HFP modified amount of core and shell: 0.0013% by mole) was used. The number average primary particle size was measured according to the above measurement method. A film molded article was prepared with the obtained fluorinated PTFE fine powder and tanδ was measured in the same manner as in Example 1. The results are shown in Table 1.

COMPARATIVE EXAMPLE 2

The number average primary particle size of the fine powder of raw material PTFE before fluorination used in Example 2 was measured according to the above measurement method. Also, tanδ was measured in the same manner as in Example 1. The results are shown in Table 1.

EXAMPLE 3

Fluorination treatment was conducted and fluorinated PTFE fine powder of the present invention was obtained in the same manner as in Example 1, except that 200 g of PTFE fine powder having a standard specific gravity of 2.194 and a core-shell structure (core: HFP modified PTFE, shell: HFP modified PTFE (chain transfer agent: ethane), total HFP modified amount of core and shell: 0.0013% by mole) was used. The number average primary particle size was measured according to the above measurement method. A film molded article was prepared with the obtained fluorinated PTFE fine powder and tanδ was measured in the same manner as in Example 1. The results are shown in Table 1.

COMPARATIVE EXAMPLE 3

The number average primary particle size of the fine powder of raw material PTFE before fluorination used in Example 3 was measured according to the above measurement method. Also, tanδ was measured in the same manner as in Example 1. The results are shown in Table 1.

TABLE 1

| Modified PTFE powder | Ex. 1 | Ex. 2 | Ex. 3 | Com. Ex. 1 | Com. Ex. 2 | Com. Ex. 3 |
|---|---|---|---|---|---|---|
| Standard specific gravity (before fluorination) | 2.224 | 2.199 | 2.194 | 2.224 | 2.199 | 2.194 |
| Standard specific gravity (after fluorination) | 2.224 | 2.205 | 2.198 | — | — | — |
| Number average primary particle size (μm) | 291 | 286 | 270 | 291 | 286 | 270 |
| Dielectric loss tangent (×10$^{-4}$) | 1.78 | 1.89 | 1.98 | 2.11 | 2.12 | 2.14 |

INDUSTRIAL APPLICABILITY

The fluorinated PTFE fine powder of the present invention has electric properties, particularly low tanδ, in a microwave range of 3 to 30 GHz and can provide a molded article excellent in extrusion moldability. Therefore, the fluorinated PTFE fine powder of the present invention is useful as material for equipment used in a microwave range such as satellite communication equipment and cellular phone base stations, for example coating material for a coaxial cable, LAN cable and electric wire for high frequency communication, and also for a printed wiring board.

The invention claimed is:

1. A polytetrafluoroethylene fine powder having a standard specific gravity of 2.180 to 2.225, which is obtained by contacting polytetrafluoroethylene fine powder having a standard specific gravity of 2.180 to 2.225 with a fluorine radical source; wherein tanδ of a sample film prepared from said fluorinated polytetrafluoroethylene fine powder at 12 GHz, which is measured by the following method using a sample film prepared under the following conditions, is at most 2.0× 10$^{-4}$:

(Conditions for preparing sample film)

Said PTFE fine powder is compression molded into a cylinder; A film having a thickness of 0.5 mm which is cut out from said cylinder is baked by heating at 380° C. for 5 minutes in a convection electric furnace; Immediately thereafter, said film is taken out into air of room temperature (25° C.) and stood to cool to room temperature at 5 to 50° C./second, to prepare a sample film:

(Measurement method of tanδ)

Changes in resonance frequency and Q value of said prepared film are measured by a cavity resonator using a network analyzer and tanδ at 12 GHz is calculated from the following equation:

$$\tan\delta = (1/Qu) \times \{1 + (W_2/W_1)\} - (Pc/\omega W_1)$$

$$\varepsilon_r = \left(\frac{c}{\pi \times L - F_0}\right)^2 \times \left\{X^2 - Y^2\left(\frac{L}{2M}\right)^2\right\} + 1$$

$$X\tan X = (L/2M)Y\cos Y$$

$$X = \frac{L}{2}\sqrt{\varepsilon_r \times k_0^2 - k_r^2}$$

-continued $$Y = M\sqrt{k_0^2 - k_r^2}$$

$$k_0 = \frac{\varpi}{c}$$

$$\varpi = 2\pi F_0$$

$$k_r = \frac{3.8317}{D/2}$$

$$Q_u = \frac{Q_L}{1 - 10^{(-Id/20)}}$$

$$Q_L = \frac{F_0}{F_1 - F_2}$$

$$W_1 = \frac{1}{8} \times \varepsilon_r \times \varepsilon_0 \times L \times \pi \times \varpi^2 \times \mu_0^2 \times J_1^2 \times J_0^2 \times \left(1 + \frac{\sin X}{2X}\right)$$

$$W_2 = \frac{1}{4} \times \varepsilon_0 \times M \times \pi \times \left(1 - \frac{\sin 2Y}{2Y}\right) \times \varpi^2 \times \mu_0^2 \times J_1^2 \times J_0^2$$

$$P_C = P_1 + P_2 + P_3$$

$$P_1 = \frac{1}{2} \times Rs \times \frac{D}{2} \times L \times \pi \times \left(1 - \frac{\sin X}{2X}\right) \times \left(\frac{J_1 \times 2}{D}\right)^4 \times J_0^2$$

$$P_2 = \frac{1}{2} \times \left(\frac{-\cos X}{\sin Y}\right)^2 \times Rs \times \frac{D}{2} \times M \times \pi \times \left(1 - \frac{\sin 2Y}{2Y}\right) \times \left(\frac{J_1 \times 2}{D}\right)^4 \times J_0^2$$

$$P_3 = \frac{1}{2} \times \left(\frac{-\cos X}{\sin Y}\right)^2 \times Rs \times \pi \times \left(J_1 \times J_0 \times \frac{Y}{M}\right)^2$$

Symbols in the equations represent the following:
D: diameter of cavity resonator (mm)
M: length of cavity resonator (mm)
L: length of sample (mm)
c: light velocity (m/s)
ID: amount of decay (dB)
$F_0$: resonance frequency (Hz)
$F_1$: upper frequency when the amount of decay from the resonance point is 3dB (Hz)
$F_2$: lower frequency when the amount of decay from the resonance point is 3dB (Hz)
$\varepsilon_0$: dielectric constant of vacuum (H/m)
$\varepsilon_r$: specific dielectric constant of sample
$\mu_0$: magnetic permeability of vacuum (H/m)
Rs: effective surface resistance considering surface roughness of conductor cavity (Ω)
$J_0$: −0.402759
$J_1$: 3.83171, and
wherein said standard specific gravity is measured pursuant to ASTM D4895-89 by water displacement of a molded article formed from the polytetrafluoroethylene fine powder.

2. The polytetrafluoroethylene fine powder of claim 1, wherein said tan δ is at most $1.8 \times 10^{-4}$.

3. The polytetrafluoroethylene fine powder of claim 1 having average particle size of 200 to 800 μm.

4. A polytetrafluoroethylene molded article comprising the polytetrafluoroethylene fine powder of claim 1.

5. A coaxial cable for high frequency communication, which is coated with the polytetrafluoroethylene molded article of claim 4.

6. A LAN cable for high frequency communication, which is coated with the polytetrafluoroethylene molded article of claim 4.

7. A printed wiring hoard having an insulator comprising the polytetrafluoroethylene molded article of claim 4.

8. The polytetrafluoroethylene fine powder of claim 1, which is capable of being formed into a molded article.

9. The polytetrafluoroethylene fine powder of claim 1, which is obtained by contacting polytetrafluoroethylene fine powder having a standard specific gravity of 2.180 to 2.225 with a gaseous fluorine radical source.

10. A process for preparing a polytetrafluoroethylene fine powder having a standard specific gravity of 2.180 to 2.225, which comprises contacting polytetrafluoroethylene fine powder having a standard specific gravity of 2.180 to 2.225 and unstable groups in a molecule terminal with a fluorine radical source.

11. The process of claim 10, wherein said fluorinated polytetrafluoroethylene fine powder is capable of being formed into a molded article.

12. The process of claim 10, which comprises contacting polytetrafluoroethylene fine powder having a standard specific gravity of 2.180 to 2.225 and unstable groups in a molecule terminal with a gaseous fluorine radical source.

13. A polytetrafluoroethylene fine powder having a standard specific gravity of 2.180 to 2.225, which is obtained by contacting polytetrafluoroethylene fine powder having a standard specific gravity of 2.180 to 2.225 with a fluorine radical source, said polytetrafluoroethylene fine powder having a core-shell structure;
wherein tan δ of a sample film prepared from said fluorinated polytetrafluoroethylene fine powder at 12 6Hz, which is measured by the following method using a sample film prepared under the following conditions, is at most $2.0 \times 10^{-4}$:

(Conditions for preparing sample film)
Said PTFE fine powder is compression molded into a cylinder; A film having a thickness of 0.5 mm which is cut out from said cylinder is baked by heating at 3800° C. for 5 minutes in a convection electric furnace; Immediately thereafter, said film is taken out into air of room temperature (250° C.) and stood to cool to room temperature at 5 to 50° C./second, to prepare a sample film:

(Measurement method of tan δ)
Changes in resonance frequency and Q value of said prepared film are measured by a cavity resonator using a network analyzer and tan δ at 12 0Hz is calculated from the following equation:

$$\tan\delta = (1/Qu) \times \{1 + (W_2/W_1)\} - (Pc/\omega W_1)$$

$$\varepsilon_r = \left(\frac{c}{\pi \times L \times F_0}\right)^2 \times \left\{X^2 - Y^2\left(\frac{L}{2M}\right)^2\right\} + 1$$

$$X\tan X = (L/2M)Y\cos Y$$

$$X = \frac{L}{2}\sqrt{\varepsilon_r \times k_0^2 - k_r^2}$$

$$Y = M\sqrt{k_0^2 - k_r^2}$$

$$k_0 = \frac{\varpi}{c}$$

$$\varpi = 2\pi F_0$$

$$k_r = \frac{3.8317}{D/2}$$

$$Q_u = \frac{Q_L}{1 - 10^{(-Id/20)}}$$

$$Q_L = \frac{F_0}{F_1 - F_2}$$

$$W_1 = \frac{1}{8} \times \varepsilon_r \times \varepsilon_0 \times L \times \pi \times \varpi^2 \times \mu_0^2 \times J_1^2 \times J_0^2 \times \left(1 + \frac{\sin X}{2X}\right)$$

$$W_2 = \frac{1}{4} \times \varepsilon_0 \times M \times \pi \times \left(1 - \frac{\sin 2Y}{2Y}\right) \times \varpi^2 \times \mu_0^2 \times J_1^2 \times J_0^2$$

-continued $$P_C = P_1 + P_2 + P_3$$

$$P_1 = \frac{1}{2} \times Rs \times \frac{D}{2} \times L \times \pi \times \left(1 - \frac{\sin X}{2X}\right) \times \left(\frac{J_1 \times 2}{D}\right)^4 \times J_0^2$$

$$P_2 = \frac{1}{2} \times \left(\frac{-\cos X}{\sin Y}\right)^2 \times Rs \times \frac{D}{2} \times M \times \pi \times \left(1 - \frac{\sin 2Y}{2Y}\right) \times \left(\frac{J_1 \times 2}{D}\right)^4 \times J_0^2$$

$$P_3 = \frac{1}{2} \times \left(\frac{-\cos X}{\sin Y}\right)^2 \times Rs \times \pi \times \left(J_1 \times J_0 \times \frac{Y}{M}\right)^2$$

Symbols in the equations represent the following:
D: diameter of cavity resonator (mm)
M: length of cavity resonator (mm)
L: length of sample (mm)
c: light velocity (m/s)
ID: amount of decay (dB)
$F_0$: resonance frequency (Hz)
$F_1$: upper frequency when the amount of decay from the resonance point is 3dB (Hz)
$F_2$: lower frequency when the amount of decay from the resonance point is 3dB (Hz)
$\epsilon_0$: dielectric constant of vacuum (H/m)
$\epsilon_r$: specific dielectric constant of sample
$\mu_0$: magnetic permeability of vacuum (H/m)
Rs: effective surface resistance considering surface roughness of conductor cavity ( )
$J_0$: −0.402759
$J_1$: 3.83171
wherein said standard specific gravity is measured pursuant to ASTM D4895-89 by water displacement of a molded article formed from the polytetrafluoroethylene fine powder.

14. The polytetrafluoroethylene fine powder of claim 13, wherein the core is formed by a homopolymer of TFE and the shell is formed by modified PTFE.

15. The polytetrafluoroethylene fine powder of claim 13, which is obtained by contacting polytetrafluoroethylene fine powder having a standard specific gravity of 2.180 to 2.225 with a gaseous fluorine radical source.

* * * * *